United States Patent [19]

Potter et al.

[11] Patent Number: 4,929,541
[45] Date of Patent: May 29, 1990

[54] DIRECT GAS FIRED INDUSTRIAL AIR HEATER BURNER

[75] Inventors: Gary J. Potter, Marthasville; David S. Schlote, House Springs; Robert W. Reinkemeyer, Wentzville, all of Mo.

[73] Assignee: Cambridge Engineering, Inc., Chesterfield, Mo.

[21] Appl. No.: 240,150

[22] Filed: Sep. 2, 1988

[51] Int. Cl.⁵ ............................................. F24H 1/00
[52] U.S. Cl. .................................... 432/222; 431/351
[58] Field of Search ............... 431/350, 351; 432/222, 432/223

[56] References Cited

U.S. PATENT DOCUMENTS 3,485,043 12/1969 Ehrich .
3,885,919 5/1975 Pillard ........................... 431/174 X
3,993,449 11/1976 Childs ............................ 431/174 X
4,573,907 3/1986 Coppin et al. ...................... 431/351

FOREIGN PATENT DOCUMENTS

560916 7/1958 Canada ............................... 431/351

*Primary Examiner*—Henry A. Bennet
*Attorney, Agent, or Firm*—Paul M. Denk

[57] ABSTRACT

In a burner assembly for location within an air supply housing for a heater and disposed for inducing the movement of air through a blower and into and around a burner assembly during heater operation to create a supply of heated air for a space to be warmed, the burner assembly being of the type having opposite side walls, and upper and lower tiered baffles forming a combustion chamber for reception and combustion of gas delivered from a gas manifold arranged approximately at the intake end of the burner assembly, a shroud arranged above and below the upper and lower tiered baffles, for directing air into an intake at the back of the gas manifold, and for diverting air through the baffles into the combustion chamber, a diverter arranged at the back end of the gas manifold for directing incoming air between the shroud and the tiered baffles, and a deflector arranged at the upper front of the top of the shroud, to delay the passage of air into the path of the combusting gases, with the sides of the combustion chamber being flared outwardly, to minimize the development of hot spots.

25 Claims, 3 Drawing Sheets

DIRECT GAS FIRED INDUSTRIAL AIR HEATER BURNER

BACKGROUND OF THE INVENTION

The burner assembly as described within this disclosure is utilized in that capacity generally defined as a direct-fired gas industrial or related type of air heater. This is not a heat exchanger, since the combustion of the gas after its ignition takes place directly within the air stream being heated, and not by conduction thereof. Hence, the heating equipment contains no flue, and all of the by-products of the combustion are released into the heated air stream, which is then directly discharged into the space being heated, and as a result it is desirable, and one of the primary advantages of this current invention, to provide means for reducing the creation and release of deleterious exhaust or gases, either in the form of carbon monoxide, or nitrogen dioxide, that is discharged during the gas combustion, and to reduce it to a minimum in order to minimize the amount of foul odors that may be directed into the space being heated, and certainly to alleviate the likelihood that any persons therein may be harmed through the breathing of such gases over a sustained period of time.

Direct-fired gas heaters typically are constructed in a variety of configurations. The majority of such heaters, as manufactured, are located with the burner being arranged upstream of the fan inlet, and which functions in a draw-through arrangement. A number of other manufacturers position the burner downstream of the fan or blower discharge, in what is defined as blow-through arrangement. An example of the latter can best be seen in the U.S. Pat. No. 3,630,499, which is owned by a common assignee to the improved burner of this current invention.

As is well known in this art, the performance characteristics of the burner necessarily determines the operational range of the heating equipment, when tested, to gauge whether it is in compliance with the various requirements of the American National Standards Institute (ANSI), governing the functioning of the direct gas-fired industrial air heaters, of the type of this invention. This is generally set forth in the ANSI standard Z83.18. Generally, the air flow through a heater of this type, and the temperature rise that occurs for the air that is being heated, determines the heating capacity of the subject unit. The air flow is directly related to the fan as selected, the motor horse power of the unit driving the fan, and the static pressure on the system during its functioning. The temperature rise is controlled by the gas flow delivered to the burner, at the given air flow rate for the capacity of air that has been blown through the unit, as induced by the blower.

As previously explained, the ANSI standards generally provide an industry self regulation of the minimum requirements that must be met by units of this design. These standards generally allow for specific maximum additive levels of four particular products of combustion that may be released from a heating unit of this type during its functioning. These products of combustion and respective allowable levels are as follows: carbon dioxide, 4,000 parts per million (ppm); carbon monoxide, 5 ppm; aliphatic aldehydes, 1.0 ppm; and, nitrogen dioxide, 0.50 ppm. These particular derived chemical compounds, which are generally recognized as undesirable by-products from the functioning of heating units of this type, and their gases of combustion, can basically be defined as unwanted derivatives, which, if they can be reduced to a minimum, not only add to the safety of all people within the heated space, but enhances the quality operations of the heating unit, as designed. The unit of this particular invention has been designed to provide for a minimization of the output of these undesirable compounds, through the unique design of particular characteristics and features built into the improved heater of this invention, to attain such desirable results.

It has been determined through testing that there are three major factors that effect the production of carbon monoxide within the gas combustion production process. Ideally, the gas and combustion air needs to be mixed as completely and thoroughly as possible as soon after the gas is introduced into the burner assembly. If too little combustion air is introduced into the burner, then incomplete combustion occurs. This raises the level of carbon monoxide output, which can easily be measured in the discharge air stream. On the other hand, if too much combustion air is introduced into the combustion process, quenching of the flame can occur, and this abrupt cooling also causes incomplete combustion. Thus, an equilibrium point desirably must be reached with respect to how much air is introduced into the burner, in combination with the amount of gas discharged from the manifold, and the location and implacement of the air intake into the combustion zone.

An additional factor which affects the development of carbon monoxide in the burning process is also related to this quenching feature of the flame, but in this particular case, with respect to this heater, the concern is with the abrupt cooling of the flame after it exits from the burner. In units of this type, the discharge air pattern leaving the fan or blower results in a greater volume of air in the upper region of the fan discharge. With the burner downstream of the blower, the burner acts as a restriction to the flow of air, thereby compressing the air, causing the velocity to increase as it passes the burner. Once the restriction is passed, the large volume of air from the upper portion of the duct expands rapidly to equalize pressure within the duct causing the cool air to impinge the flame tips that are extending beyond the end of the burner. This type of air impingement causes a quenching of the flame in prior art devices, and had increased CO output.

The manner in which the air is introduced into the burner is a factor which is just as important as to how much air is introduced into the same. It has been found that the output level of carbon monoxide can readily be reduced by limiting the amount of combustion air early in the burner, near the gas ports, and supplying more air later, or further downstream, within the burner assembly. Thus, combustion takes place early in the burner at low combustion rates. With high combustion rates, as when an abundance of gas is introduced through the manifold, such combustion takes place more thoroughly throughout the whole burner assembly and more downstream from the intake gas manifold. Therefore, at lower combustion rates, less gas and less air will by necessity be needed to support such combustion. Also, at higher combustion rates, when more air is needed, it is preferably supplied more downstream in the burner assembly.

The current invention has been designed to take into consideration these various features, and to not only regulate the amount, capacity, and particularly location of the quantity of gas being ejected from the manifold into the chamber of combustion, but likewise, to provide for its adequate positioning, within the area of combustion, and to inject the adequate amount of air to augment combustion, at particular locations, and at specific amounts, in order to enhance the efficiency of combustion, and thereby reduce the development of carbon monoxide.

In addition to the foregoing, the subject matter of this invention further contemplates modifications to the structure of the burner embodiment, and more specifically its various formed chambers, in order to minimize the amount of heat exposure of the various walls and chambers, in addition to adding modifications to select baffled tiers to better isolated areas of desired maximum combustion, to reduce the development of hot spots upon the various structure walls, and thereby, which has been found through experimentation and research, to significantly reduce the development of nitrogen dioxide, and its emission, from the burner of this invention during its functioning.

SUMMARY OF THE INVENTION

The subject matter of this invention contemplates modifications to the structure of pre-existing burner designs of this type, which is previously explained, one of which is generally shown in the U.S. Pat. No. 3,630,499, as owned by a common assignee to this invention. As can be readily seen therein, burners of this type are generally fabricated of a pair of walls, and upper and lower tiers of air admitting surfaces, in order to form a combustion chamber, and which arranges a manifold at its intake end, in order to inject adequate supplies of gas into the combustion chamber, which in combination with the entering air, forms the source of combustion for heating of the supply of air forced through the burner assembly, and the duct or housing in which the burner, and its blower, locate. The main components of the burner of this current design, as improved, include its baffles, which have been rearranged and reconstructed, particularly where located in proximity with the gas manifold, to provide more adequate control of the amount of air entering into the area of combustion. The manifold, which introduces the supply of gas into the burner, has likewise had its outlet ports or gas orifices uniquely designed, through emperical testing, to determine the exact amount and desired quantities of gas to be strategically injected into the area of combustion, in order to attain efficient combustion, and the reduced development of carbon monoxide, for reasons as previously explained. In addition, the side walls of the burner assembly have been redesigned, and formed principally in an arrangement that achieves their flaring, gradually outwardly, away from the area of combustion, so as to minimize or reduce their direct exposure to the origin or center of combustion, and therefore, reduce, if not completely eliminate, the generation of hot spots, along the side walls, which normally induce the creation of nitrogen dioxide, which is another undesirable exhaust which, in older burner designs, is created, and enters directly into the heated air stream for discharge into the building being warmed. In addition, an extension is provided particularly at the upper front region of the burner chamber, in order to reduce the amount of downflow of air, at this location, as it is forced by the blower around the burner chamber, and into the mainstream of airflow within the duct, where it combines with the heated air, for discharge into the space to be heated. Normally, with existing burner designs, and since the usual blower utilized in conjunction with gas air heaters, creates a greater volume of air within the upper regions of the duct, than that which is induced in its lower regions, there is greater air pressure flowing around the upper sections of the combustion chamber, and which is discharged and forced downwardly, along the upper front edge of the chamber, which will result in the abrupt cooling of the flame tips extending beyond the end of the combustion chamber. The deflector of this invention, as located, has been found to alleviate this particular deficiency, and thereby, provides for the delay of the expansion or equalization of the air pressure downstream of the flame tips which are present when the burner is functioning at its maximum firing capacity. Through these modifications to the tiered baffles, manifold orifices, air intake means within the combustion chamber, and the locating of an extension plate, the production of undesirable Co and $NO_2$ is reduced to a minimum. In addition, heater efficiency has been enhanced, to add a valuable contribution to the usage and operations of a direct gas-fired heater of this design.

Figure 6:
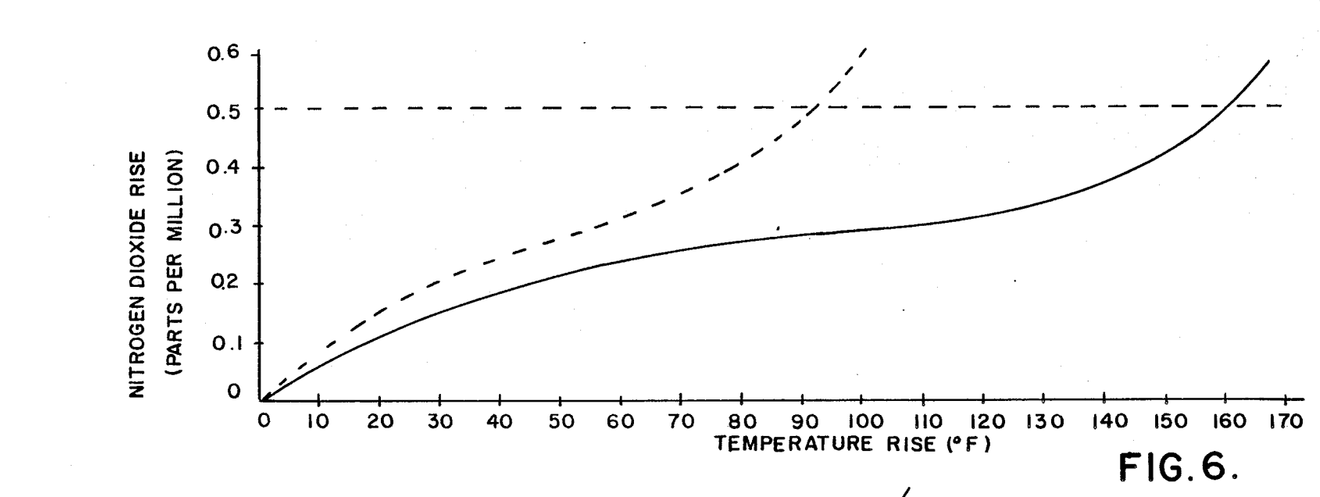
FIG. 6, as aforesaid, is a graph showing the temperature rise versus development of nitrogen dioxide within both the prior art and current burner assemblies.
Figure 7:
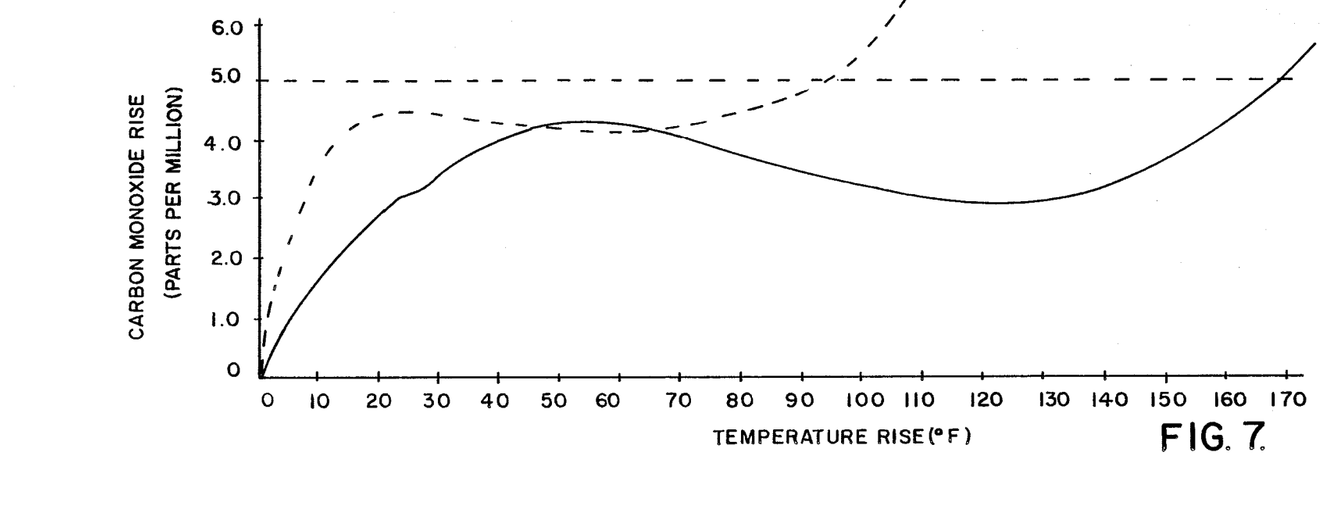
FIG. 7 is a graph disclosing a comparison between the temperature rise versus the developed carbon monoxide within the prior art and the burner of the current invention.

Attention is directed to FIGS. 6 and 7 of the drawings, which provide a comparison in the amount of noxious gases produced within a heater of this current design, in comparison to the amount of such gases produced within the state of the art burners. As can be seen in FIG. 6, this provides an indication of the amount of nitrogen dioxide created within both the prior art and current burners of this invention. The ordinate indicates the quantity in parts per million of nitrogen dioxide developed within the burners, while functioning, while the abscissa discloses the temperature rise in the corresponding units. The dash line indicates data and results obtained during usage of the burner as shown in the U.S. Pat. No. 3,630,499, as aforesaid, while the solid line indicate readings taken during testing of the heater of this improved design.

It should be stated herein that state of the art burners were evaluated against the ANSI Standard Z83.4 for direct gas-fired make-up air heaters. In make-up air applications, temperature rise in excess of 94° F. were not necessary because the purpose of this equipment was to replace air being exhausted from the building and not to provide for the heating requirements of the facility.

On the other hand, the current design burners are evaluated against the new ANSI Standard Z83.18 for direct gas-fired industrial air heaters. The purpose of this equipment is to offset the building heat loss, thereby providing the space heating requirements of the facility. It is advantagious to have a higher temperature rise in order to minimize the air throughout while maximizing the heat output to match the heat load of the facility. Thus, as shown in FIG. 6, in the functioning of the prior art unit, where it obtained a temperature rise of approximately 94° F., during its functioning, it produced nitrogen dioxide as gauged within the output heated air at approximately 0.5 parts per million (ppm). But, through the modifications to the various components of the burner, in the manner as described herein, and to be subsequently analyzed in the description of the preferred embodiment, a temperature rise in the vicinity of 160° F. produced yet only 0.5 ppm of nitrogen dioxide within the output heated air. Thus, an approximate seventy percent increase in temperature of heated air as output has been attained, through usage of the improvements of this invention, over the corresponding temperature rise in the prior art device, with no increase in the generated nitrogen dioxide.

In referring to FIG. 7, a comparison is made between the carbon monoxide rise during burning, in both the prior art type of burner, and the improved burner of this current design. In addition, as can be readily seen, the carbon monoxide parts per million generated during heater functioning is disclosed along the Y coordinate, while the temperature rise induced during heater functioning is disclosed along the X coordinate. As shown, in the state of the art device, an approximate 94° temperature rise in the output of the heated air, when tested, disclosed a 5.0 ppm level of created carbon monoxide. On the other hand, in the improved burner of this design, a temperature rise of approximately 170° F. produced only a corresponding creation of 5.0 ppm of carbon monoxide within the heated output air. Thus, an approximate eighty-one percent increase in temperature of the output heated air from the assembly, of the improved burner, produced no greater rise in the created carbon monoxide level in the heated air. It is believed that these efficiencies, as readily disclosed within these described figures, have been obtained through the modifications made to the design of this current heater, as summarized and analyzed herein.

DESCRIPTION OF THE PREFERRED EMBODIMENT

Figure 1:
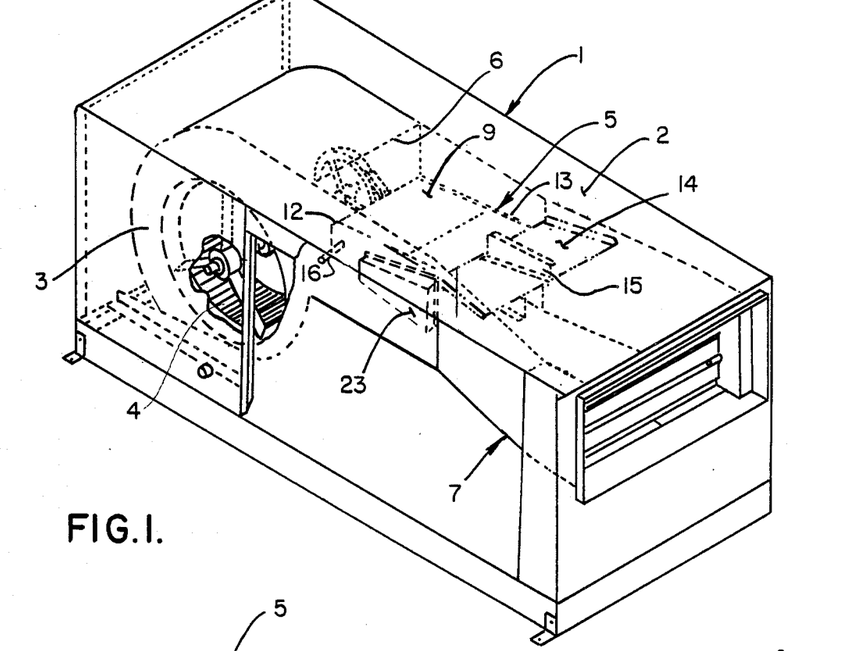
FIG. 1 is an isometric view of the housing and ductwork encasing the blower and burner assembly of this invention.

In referring to the drawings, and in particular FIG. 1, there is shown the heater 1 of this invention, which, as disclosed, includes a form of housing 2. The blower 3 may be operated through the usual motor (not shown), which causes its rotation, and movement of the vanes, as at 4, for inducing a volumetric flow of air. This type of heater usually may be mounted upon the roof of a building, or perhaps just interiorly of an outside wall, to induce the intake of outside air, heat it, and then discharge it into a particular space, generally within an industrial or other commercial building, to attain a warming of the internal air thereof.

A burner assembly, as at 5, is arranged just forwardly of the outlet 6 of the blower, in a manner that is well known, and functions to provide for combustion of gas to furnish direct heating of the flowing air, for purposes as previously described. Provided forwardly of the blower assembly is additional ductwork, as at 7, and which has an outlet for discharging its heated air to the environment to be warmed.

The burner assembly 5 includes a lower and upper shroud, 8 and 9 respectively, and incorporates side walls, as at 12 and 13. A deflector, as at 14, is provided at the front edge of the upper shroud 9, or its upper surface, and is mounted by means of its shown Z-brace 15 to the interior surface of the upper wall of the shown ductwork 7. The purpose of this deflector, as previously reviewed, is to allow the air passing from the blower 3, or at least that air passing along the upper shroud surface 9 to be delayed in its discharge into the path of the heated combustion gases produced by the burner assembly 5. As previously explained, when a blower is installed in the arrangement as shown in the attached drawing, of FIG. 1, there is a tendency for a greater volume of air to be generated in the upper region of the blower, than more downwardly thereof. As a result, a greater volume of air passes around the burner assembly 5 in its upper region, than at its lower portion, thereof. Hence, this has a tendency to cause the cool outside air, and the hot combustion gases, in the prior art type of devices, to be abruptly mixed as the higher pressure air expands and equalizes in the ductwork, quenching the flame tips extending beyond the end of the burner, which is undesirable. Installaton of the deflector 14 in the manner as shown, delays the expansion of the flowing air, at the end of this shroud, so as to prevent the quenching of the flame as it exits.

There is also disclosed a gas intake pipe 16 at the side of the burner assembly 5 and which provides for the conduct of gases to the manifold of the burner assembly.

Figures 2, 3:
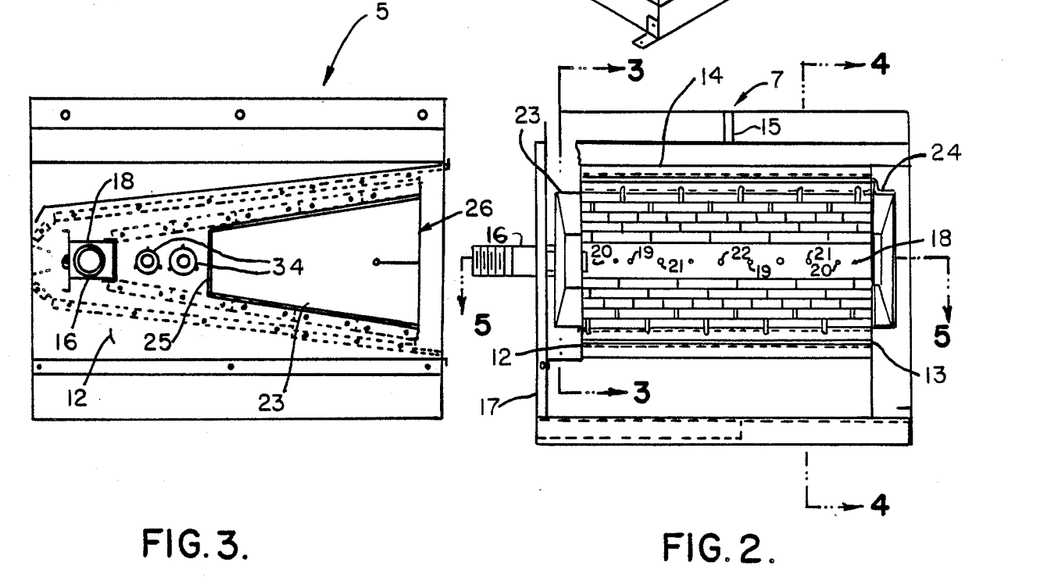
FIG. 2 is a front view of burner assembly of this invention.
FIG. 3 is a side view thereof, taken along the line 3—3 of FIG. 2.

As can be seen in FIGS. 2 and 3, the burner assembly 5 mounts by means of flanged connection, as at 17, to the proximate or one side wall of the ductwork 7. Additional flange means may be provided at the bottom of the burner assembly, to achieve stability in its installation. The burner assembly includes the side walls 12 and 13, and incorporates therein a gas manifold 18, that extends from side to side of the burner assembly, receiving its charge of combustible gas from the intake pipe 16, as previously explained. As noted in FIG. 2, these discharge ports are of varying dimension, having smaller dimensioned openings at their proximate side edges, as can be seen at 20, than the discharge ports arranged more inwardly thereof, such as disclosed at 21. In addition, it has been found through experimentation that it is desirable to, once again, reduce the dimension or diameter of the gas discharge ports, as at 22, arranged approximately centrally of the manifold 18. These gas discharge ports may vary in dimension between approximately 3/32" to approximately ¼" in diameter. The purpose for this, as previously summarized, is that it has been found desirable to control the capacity of the gas discharge into the combustion chamber, to reduce the amount of gas entering into the chamber at approximately the side edges of the manifold, in order to minimize the development of hot spots along the side walls of the combustion chamber, and thereby likewise decrease the amount of nitrogen dioxide generated. In addition, it has further been found efficient to reduce the amount of gas entering into the combustion chamber at approximately a central location of the gas manifold, as disclosed and explained herein. But, the gas discharge ports to either side of these locations, or between the arranged smaller ports, have increased size, as can be noted. The smaller ports are approximately 3/32" in diameter, while the larger ports are approximately 5/32" in diameter. In some designs, it is necessary that the smaller orifices be of a greater size, and correspondingly, the larger orifices be of greater diameter, as for example, up to a ¼", in order to achieve the required volumetric flow of gas within the available gas pressure.

As can also be seen in FIG. 2, the deflection plate 14 extends upwardly to the sides of the ductwork 7, and supported by its Z brace 15, to the ductwork. This allows for a delay in the discharge of the air passing along the upper portion of the combustion chamber, and its shroud, into the heated air discharging from the said combustion chamber, as previously explained.

As further noted in FIG. 2, the side walls 12 and 13 of the combustion chamber incorporate flared extensions, as at 23 and 24, and these flared extensions provide greater spacing laterally of the combustion chamber, to expand outwardly the walls for such chamber, and thereby reduce the potential for the development of hot spots, along these walls, as has frequently occurred with prior art burners, and which, as previously explained, had a tendency to undesirably create a greater quantity of nitrogen dioxide, during heater operations. As can be seen, these flared extensions are of lesser dimension at their back ends, as at the location of their back wall 25, than at their front ends, as at 26. This provides greater volumetric spacing and clearance as the heated combustion gases move forwardly under the force of the passing air, during burner functioning. As noted, these wall extensions are flanged for facilitating their mounting to the walls 12 and 13, but could be stamped into the side walls.

Figure 4:
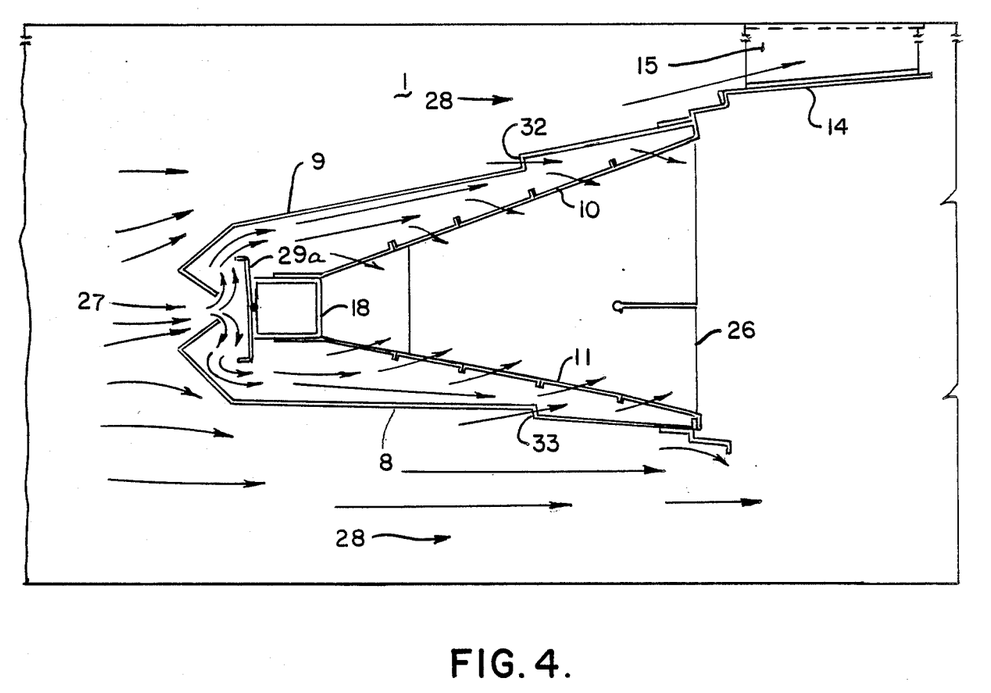
FIG. 4 is a schematic type longitudinal sectional view of the burner assembly, shown arranged within the housing, as taken approximately along the line 4—4 of FIG. 2.

A more accurate depiction of the actual functioning of the burner assembly of this invention can be more easily determined upon viewing FIG. 4. As disclosed, the burner assembly 5 is arranged within the ductwork 7, and includes its particularly styled gas manifold 18, and the tiered upper and lower baffles 10 and 11 as noted. The lower and upper shrouds, 8 and 9, are disclosed, and function to divert the incoming air from the blower, as at the left edge of the figure as shown, either directly into the shroud inlet, as at 27, or around the same, as along the path of movement, as depicted at 28, for eventual discharge into the path of the heated gases, downstream of the burner assembly. The positioning of the deflector 14 as extending from the front edge of the upper shroud 9, can be more accurately seen. Thus, the air passing over the deflector 14, enters into the path of the heated gases after the flame tips in the combustion zone.

The intake end of the shroud 27 extends generally from side to side of the burner assembly, and has an intake dimension, heightwise, of approximately 5/16" to 2" dimension. A diverter 29a is arranged along the back of the manifold 18, and effectively diverts the incoming air to pass either above or below the said manifold, as depicted by the air flow arrows as shown, and provides for passage of the air within the shrouds, and through the tiered baffles 10 or 11, and into the location of the combustion chamber where gas combustion takes place, during functioning of this heater.

Figure 5:
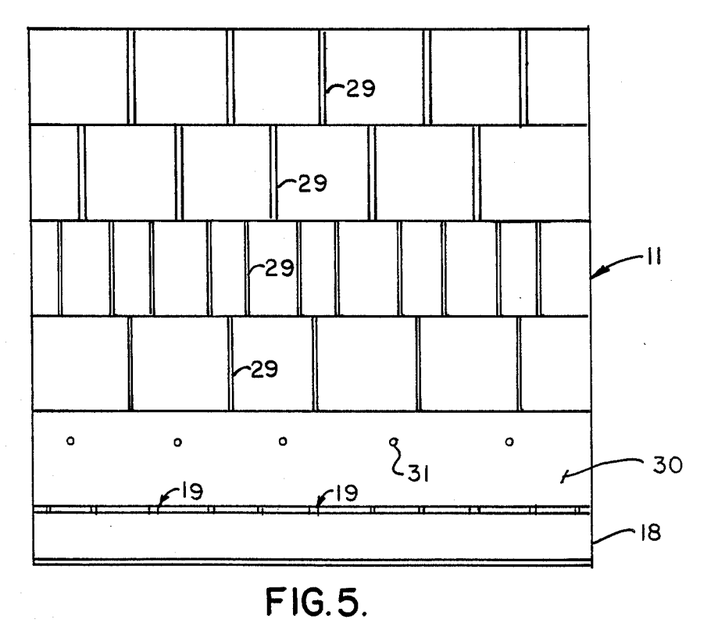
FIG. 5 is a horizontal sectional view of the burner assembly taken approximately along the line 5—5 of FIG. 2.

As can be seen in FIG. 5, one of the tiered baffles, in this case, the lower baffle 11, is quite accurately disclosed, as extending from the gas manifold 18. The various discharge ports 19 from the front of the gas manifold are disclosed, and their relationship with respect to the tiered baffles can be quite accurately seen.

The tiered baffles include a series of openings, generally in the form of elongated slots, as at 29, to provide for that diverted air that passes intermediate the lower and upper shrouds 8 and 9, to pass through the upper and lower tiered baffles 10 and 11, for controlled entrance directly into that location where ignition and combustion of the manifold discharge gases enters into the burner assembly. But, as previously reviewed and summarized, it is desirable to carefully regulate the entrance of that air into the combustion chamber, so as to have adequate control and equalization of the ratio between the air as mixed with the gases in order to assure both efficient and maximum combustion, and to reduce development of carbon monoxide. As a result, that last tier of baffles, as at 30, both in the upper and lower baffles 10 and 11, includes, instead of slots, a series of arranged orifices, as at 31, and which are sized between about 1/32" through 5/32", with 3/32" having been found to be the desirable dimension. And, these orifices are arranged approximately between the midpoint and the downstream end of this initial baffle adjacent to the gas manifold. Obviously, other locations may yet work. Furthermore, it has been found through testing that arranging these orifices at a position intermediate each pair of manifold discharge ports 19 has been very effective to provide an efficient combustion of the gases, as intermixed with the incoming air, to provide efficient combustion of the type that produces greater heating efficiency, at lesser creation of noxious gases, in the manner as previously reviewed with respect to the graphs as shown in FIG. 6 and 7 of the drawings. Thus, arranging these type of orifices 31, at this location, in proximity to the varying sized discharge ports 19 of the gas manifold, has been found to prevent a too great of quenching of the combustion flame at this location, so as to reduce the amount of carbon monoxide created, and at the same time, does not present any starving of the flame through the entrance of too little of oxygen, which would occur if such orifices were not provided. In addition, the entrance of air through these orifices 31 at this location does not cause any impingement upon the produced flame, which otherwise causes it to shift either upwardly or downwardly within the combustion chamber, and which otherwise create hot spots upon the metallic surfaces of the burner baffles 10 and 11, as occurred in prior art devices, and which naturally produces, as previously explained, a generation of noxious nitrogen dioxide, which is generally undesirable, as reviewed. In the preferred embodiment, the apertures or orifices 31 as shown are generally arranged intermediate each next adjacent pair of discharge ports 19, as disclosed. In addition, it is desirable to stagger the orifices 31 that are provided through the next adjacent upper tiers of the baffle 10, so that the orifices 31 in the lower baffle will be arranged offset by one discharge port 19, with respect to the orifice provided within the next adjacent or last tier of baffle 30, as noted.

It is also to be noted in FIG. 5 that the various tiers of slots 29 provided within the baffle arrangement are staggered, in location, with some of the slots in certain tiers being wider than those in other tiers of the baffle. This is done because some quantity of air is needed closer to the manifold in the burner to reduce the $NO_2$ output, by providing some degree of cooling of the metal surface at that location, but at the same time, not to inject too much air at this location which may have a tendency to quench the flame and thereby cause a high $CO_2$ output, which is also undesirable. To compromise this situation the tiered baffles have slots that extend out through the final or outer tier from the manifold, but maintain a wider spacing for the slots in select of the tiers, as can be seen, in order to reduce or regulate air injection into the area of flame combustion. As noted, the slots in the second tier are relatively narrow, such as approximately 1/16", but spaced wider apart. The slots in the third tier, that being the second row of baffled slots downstream from the manifold burner, are arranged closer together to provide the injection of a little more air at that location, as the combustion rate gets higher at that vicinity. But, these third tier baffle slots could approximately duplicate the second tier slots, depending upon the air inlet width 27. On the other hand the wider slots on the final two tiers, comprising those baffled tiers furtherest away from the manifold burner and are designed to allow for larger quantities of air to flow at lower velocities into the path of the moving combustible flame. It can be seen that some of the individual slots are wider in dimension, thereby allowing more air to flow through them, even though the adjacent slots themselves are spaced wider apart. The design for the baffle plate in its entirety has been emperically derived in order to provide for a controlled release of air, through the tiered baffles, and into the path of the combustible flame, in order to provide for a more complete combustion, at a greater efficiency, with reduced generation of noxious gases, as previously explained. Hence, the design for the burner assembly of this current invention, it is submitted, significantly increases the efficiency of functioning of a burner of this type, through the addition of various components, rearranged structure, and designed air flow and gas discharge passages which achieve the results as reviewed within this disclosure.

A careful regulation of the air inlet, as at 27, within the dimensions as described herein, for the formed shrouds 8 and 9, has likewise cooperated in producing the effective results desired for the burner assembly of this invention, to maximize the efficiency of operation of this device. These enhanced results can be readily determined from a review of the data as plotted within said FIGS. 6 and 7, as aforesaid. Hence, even flame distribution throughout its length is attained from the burner assembly of this invention, from the arrangement of the components as described herein. This burner assembly has been found to produce the temperature rise as desired, and as sanctioned by ANSI standard, without any increase in the generation of CO and $NO_2$. And, while the prior art burner, being of the 16" type, may have produced 40,000 BTU per inch, or 600,000 BTU per hour in its functioning, a 20" burner of this new design can now produce 140,000 BTU per inch of burner, or for a total of 2,800,000 BTU per hour, but with no significant increase in the generated noxious gases, such as the carbon monoxide, and nitrogen dioxide as previously explained. This has been found to be a significant improvement over prior type of burners, even the one as shown in the assignee's prior U.S. Pat. No. 3,630,499, as illustrated.

As disclosed in FIG. 4, it can likewise be seen that the lower and upper shrouds 8 and 9 include various supplemental intakes, as at 32 and 33, to further enhance the burn of the combustion gases, and to provide for intermix of the air being heated as passing through the burner assembly, during warming by the heater unit of this invention. As can also be seen in FIG. 3, various ignitors and flame rods, as at 34, are provided for furnishing automatic ignition of the heater, and more specifically as burner assembly, when initiating the operations of the heater.

As further noted in the various figures of the drawings, various stiffeners may be used at various locations within the construction of the shroud, the tiered baffles, or even in the ductwork assembly itself, so as to reduce deformation of these various components when subjected to the high temperatures of combustion during functioning of the burner assembly of this invention. Ordinarily, the quantity of air induced by the blower and passing through the ductwork during heater operation will be sufficient to absorb the heat of combustion, to warm such air, and provide such equalization that any warping or deformation would not occur, but in the event that an imbalance in operation of the heater should occur, such stiffeners alleviate the potential for such to happen. In addition, it has been found useful to incorporate five tiers to the baffled structure within the baffle plate assembly, as can be seen in FIG. 5, over the three such tiers as used in prior art burners, and to incorporate the primary air intake, as shown at 27, and the secondary air openings, as at 32 and 33, within the shroud arrangement, to enhance and maintain that proper balance between the incoming air, and the combusting gases, during the burner assembly functioning. Obviously, greater number of tiers could be employed.

To provide an indication as to the general parameters of the burner assembly of this invention, and its operational capacities, a burner of this design may incorporate a manifold of approximately ten inch width, and usually, for a manifold of that approximate design, it may have a volumetric air flow through the housing of approximately 1,000 cfm to 4,000 cfm. In addition, gas flow through that type of manifold may be within a range of approximately 60,000 BTU's per hour, up to approximately 800,000 BTU's per hour. Furthermore, a burner assembly of this design could incorporate a manifold up to a width as great as, in select instances, five feet. In that large size, it is likely that the air flow capacities of the housing would be somewhere in the vicinity of up to 70,000 cfm, from a lower capacity. In addition, the manifold itself may sustain a gas flow to produce BTU's from any lower amount, up to approximately 12,000,000 BTU's per hour. This is an example of the wide range of size of design for the housing, the manifold, their capacities for air and gas flow, and which when designed in accordance with the teachings of this invention, will function quite effectively and efficiently, to produce the desired results, and yet do so at a much lower production of deleterious noxious gases, in the category of carbon monoxide and nitrogen dioxide, over prior art designs.

Variations or modifications to the subject matter of this disclosure may occur to those skilled in the art upon reviewing the description of the invention as provided herein. For example, in a burner assembly that incorporates the deflector, diverter, varying sized orifices within the manifold, it is likely that the small or minuscule orifices provided within the first tier of baffles could be slightly shaped, such as comprising short ovals, or slots, and yet work effectively to approximately achieve the intended results for this invention. Such variations, if within the spirit of this invention, are intended to be encompassed within the scope of the claims to patent protection that issue upon this development. The description of the preferred embodiment set forth herein is done so for illustrative purposes only.

Having thus described the invention what is claimed and desired to be secured by Letters Patent is:

1. In a burner assembly for location within an air supply housing and ductwork for a heater and disposed for inducing the movement of air through a blower and into and around a burner assembly during heater operation to create a supply of heated air for a space to be warmed, said burner assembly being of the type having opposite side walls and upper and lower tiered baffles forming a combustion chamber for reception and combustion of gas delivered from a gas manifold arranged approximately at the intake end of the burner assembly, the improvement which comprises said gas manifold having a series of gas discharge ports provided along its length, and said discharge ports being of varying sizes.

2. The invention of claim 1 and wherein said gas manifold extending approximately from side to side of the combustion chamber, and said varying sized discharge ports having smaller dimension at those ports arranged at the sides of the said manifold to larger dimensioned ports provided more inwardly thereof.

3. The invention of claim 2 and wherein said dimensioned discharge ports varying between 1/16" to ¼" in diameter.

4. The invention of claim 2 and wherein said gas manifold also having reduced dimensioned discharge ports located approximately centrally of said manifold.

5. The invention of claim 2 and wherein said upper and lower tiered baffles each formed having a series of adjacently arranged tiers with each incorporating a series of openings therein for introduction of air into the combustion chamber during burner operation, those upper and lower tiers arranged next adjacent to the gas manifold incorporating a series of minuscule orifices directing a lesser quantity of air towards the combusting gas within the combustion chamber during heater functioning.

6. The invention of claim 5 and wherein said minuscule orifices being approximately between 1/16" to 5/32" in diameter.

7. The invention of claim 5 and wherein one of each minuscule orifice being aligned intermediate each pair of adjacent discharge ports of the gas manifold.

8. The invention of claim 6 and wherein said openings in the other tiers being elongated slots extending longitudinally of the burner assembly.

9. The invention of claim 8 and wherein said slots in one tier being staggered from the slots in the next adjacent tier.

10. The invention of claim 9 and where the slots in one select tier being of greater width than the slots in the next adjacent tier.

11. The invention of claim 1 and including a deflector connecting with the proximate upper front of the burner assembly and extending from approximately the forward end of the upper tiered baffle and provided for delaying and controlling the discharge of the flowing air passing through above the burner and to the front of the burner assembly during functioning of the heater.

12. The invention of claim 11 and wherein said deflector extending from side to side of the ductwork in which the burner assembly locates.

13. The invention of claim 1 and wherein said opposed side walls having flared extensions formed thereon, said extensions flaring outwardly and increasing heightwise in their extension from their proximity with the gas manifold.

14. The invention of claim 1 and including a shroud arranged intermediate the burner assembly and the ductwork, said shroud useful for diverting a quantity of the blower induced air either around the burner assembly or into the combustion chamber, said shroud having an intake arranged behind the gas manifold for intaking of a capacity of the blower induced air for passage through the tiered baffles and into the combustion chamber during heater operation.

15. The invention of claim 14 and wherein the shroud intake extending approximately from side to side of the burner assembly, and having a height of approximately between 5/16" to 2" in dimension.

16. The invention of claim 15 and including a diverter arranged approximately at the back of the gas manifold, and forwardly of the shroud intake, and functioning to divert the incoming capacity of air towards the vicinity of the space between the arranged shroud and the tiered baffles of the burner assembly.

17. The invention of claim 14 and including a deflector connecting with the proximate upper front of the shroud and extending from approximately the forward end of the upper shroud and providing for delaying and controlling the discharge of the flowing air passing through the upper housing and to the front of the burner assembly during functioning of the heater.

18. The invention of claim 5 and wherein one of each minuscule orifice within each initial tier being aligned intermediate each alternate pair of adjacent discharge ports of the gas manifold.

19. In a burner assembly for location within an air supply housing and ductwork for a heater and disposed for inducing the movement of air by way of a blower and into and around a burner assembly during heater operation to create a supply of heated air for a space to be warmed, said burner assembly being of the type having opposite side walls and upper and lower tiered baffles forming a combustion chamber for reception and combustion of gas delivered from a gas manifold arranged approximately at the intake end of the burner assembly, the improvement of which comprises said gas manifold having a series of gas discharge ports provided along its length, said upper and lower tiered baffles each formed having a series of adjacently arranged tiers with each incorporating a series of openings therein for introduction of air into the combustion chamber during burner operation, those upper and lower tiers arranged next adjacent to the gas manifold incorporating a series of minuscule orifices directing a lesser quantity of air towards the combusting gas within the combustion chamber during heater functioning.

20. The invention of claim 19 and wherein one of each minuscule orifice being aligned intermediate each pair of adjacent discharge ports of the gas manifold.

21. The invention of claim 20 and wherein one of each minuscule orifice being aligned intermediate each alternate adjacent pair of discharge ports of the gas manifold.

22. The invention of claim 21 and wherein the minuscule orifices provided within the next adjacent upper tier being staggered with respect to the minuscule orifices provided within the next adjacent lower tier of the baffles.

23. In a burner assembly for location within an air supply housing and ductwork for a heater and disposed for inducing the movement of air by way of a blower and into and around a burner assembly during heater operation to create a supply of heated air for a space to be warmed, said burner assembly being of the type having opposite side walls and upper and lower tiered baffles forming a combustion chamber for reception and combustion of gas delivered from a gas manifold arranged approximately at the intake end of the burner assembly, the improvement which comprises said gas manifold having a series of gas discharge ports provided along its length, a shroud arranged intermediate the burner assembly and the ductwork, said shroud useful for diverting a quantity of the blower induced air either around the burner assembly or into the combustion chamber, said shroud having an intake arranged behind the gas manifold for intaking of a capacity of the blower induced air for passage through the tiered baffles and into the combustion chamber during heater operation, and a deflector connecting with the approximate upper front of the shroud and extending from approximately the forward end of the upper shroud and providing for delaying and controlling the discharge of the flowing air passing through the upper housing and to the front of the burner assembly during functioning of the heater.

24. In a burner assembly for location within an air supply housing and ductwork for a heater and disposed for inducing the movement of air by way of a blower and into and around a burner assembly during heater operation to create a supply of heated air for a space to be warmed, said burner assembly being of the type having opposite side walls and upper and lower tiered baffles forming a combustion chamber for reception and combustion of gas delivered from a gas manifold arranged approximately at the intake end of the burner assembly, the improvement which comprises said gas manifold having a series of gas discharge ports provided along its length, and said discharge ports being designed to varying sizes.

25. In a burner assembly for location within an air supply housing and ductwork for a heater and disposed for inducing the movement of air by way of a blower and into and around a burner assembly during heater operation to create a supply of heated air for a space to be warmed, said burner assembly being of the type having opposite side walls and upper and lower tiered baffles forming a combustion chamber for reception and combustion of gas delivered from a gas manifold arranged approximately at the intake end of the burner assembly, the improvement which comprises said gas manifold having a series of gas discharge ports provided along its length, and with the opposed side walls of the burner assembly having flared extensions formed thereon, said extensions flaring outwardly and increasing heightwise in their extension from their proximity with the gas manifold.

* * * * *